Patented May 6, 1952

2,595,983

UNITED STATES PATENT OFFICE 2,595,983

HEAT-SET INKS COMPRISING POLYVINYL TERPENE ETHERS

Walter S. Ropp, Wilmington, Del., assignor to Hercules Powder Company, Wilmington, Del., a corporation of Delaware No Drawing. Application August 25, 1950, Serial No. 181,587

8 Claims. (Cl. 260—33.6)

This invention relates to heat-set printing inks. More particularly, it relates to heat-set printing inks including as a resinous ingredient a polymerized vinyl ether of a terpene alcohol.

Modern high speed printing presses require inks that are extremely fast drying. No particular problem arises in this respect in connection with the printing of porous stock such as newspaper stock due to its absorptive characteristic. The printing of less porous stock such as that used in the better grade magazines, etc., however, does give rise to a drying problem. Special inks have been developed for this purpose known as heat-set inks, so-called due to the fact that in the printing process the freshly printed stock is dried by subjecting it to elevated temperatures to remove the solvent. The stock may be treated in such a manner as by passing the stock rapidly over a free flame to flash off the solvent, or it may simply be subjected to a sufficiently elevated temperature to cause the solvent to evaporate. Such heat-set inks are composed of a synthetic resin (sometimes slightly plasticized) dissolved or dispersed in an organic solvent having a fairly narrow boiling range and having a low vapor pressure at room temperatures and a high vapor pressure at elevated temperatures. The synthetic resins which are used commercially in such compositions are mainly the maleated rosin esters, modified phenolic resins, and the zinc resinates.

Heat-set inks characteristically give dull printed surfaces. This condition is probably due to the high pigment content of the inks. If the paper stock employed tends to be absorptive to any substantial degree, this condition accentuates the dullness of the printed surfaces. There are obviously applications in which glossy rather than dull printed surfaces are desirable. To date, however, the procedures for achieving gloss have been rather cumbersome for practical application and leave much to be desired. One example of the prior art procedures for achieving gloss is that described in U. S. 2,317,372 to Gessler et al. According to this disclosure high gloss prints on a web traveling at high speed are obtained by printing on the surface of the traveling web with a heat-set ink, dusting the resultant ink film with a resin having a softening point of at least 100° C. and soluble in hot petroleum hydrocarbons, removing the excess dusting composition and heating the printed surface to evaporate the solvent. Another example, of course, is the use of overprint varnishes. Other disadvantages of the heat-set inks known to the art include lack of hold-out of ink on the paper, the absence of good scuff resistance and poor flexibility. Repeated efforts at curing these defects have heretofore been unsuccessful.

Now in accordance with this invention it has been found that heat-set printing inks comprising coloring matter dispersed in a vehicle comprising a resinous binder component in solution in a solvent therefor which is substantially nonvolatile at 70° F. but which has a comparatively high vapor pressure at temperatures of the order of 200°–240° F., the major part of said resinous binder component being a resinous polymer of a vinyl ether of a terpene alcohol, the resinous polymer having a drop softening point of at least about 130° C., provide prints having characteristics heretofore unobtainable. The solvents used in this connection are those customarily employed in this art. For reasons of economy, the solvents usually employed are petroleum solvents.

The printing inks of this invention excel in several respects. Despite the rather high melting points of the resinous polyvinyl terpene ethers used in making the inks, the ink films are unusually flexible. There is an obvious need for a rather flexible ink film to withstand the normal treatment given prints, say in the form of magazines, etc. in everyday usage. It has been customary in the art to add softeners or plasticizers in formulating heat-set inks in order to provide a sufficient degree of flexibility in the ink films. In using the polymers of vinyl ethers of terpene alcohols in accordance with this invention, however, it has been found that the ink films possess an inherent flexibility such that no added plasticizers or softeners are necessary. Ink films comprising such polymers are inherently so flexible and possess such good adhesion to the paper that the problems of cracking and related phenomena are never encountered.

The ink films resulting from the printing inks of this invention are furthermore tough, they exhibit good binding action for the pigment, and they adhere well to the paper. These characteristics are important due to the fact that it is quite common practice in this art to print one side of a web of paper and after it has been dried, to reverse the web and print the opposite side. The reversal of the web is accomplished by passing the same over a suitable roller. It is necessary that the ink films withstand this operation without scuffing. The subject printing inks are outstanding in this respect due to the fact that the ink films resulting therefrom exhibit the above-mentioned characteristics—toughness, good adhesion to paper, and good binding action for the pigment. Besides these advantageous characteristics, the inks of this invention also represent a great improvement over the heat-set inks known to the art in that, according to a specific embodiment of the invention, it is possible to obtain glossy prints without resort to any additional processing steps over and above the heating step customarily employed in using heat-set inks. Thus, the use of expedients such as the above-described dusting of freshly printed stock with powdered synthetic resin is avoided entirely.

Having described the invention in its broad aspect, the following specific examples thereof are given as illustrative. All parts and percentages are by weight unless otherwise indicated.

EXAMPLE 1

(a) *Preparation of polymer of the vinyl ether of dihydro-α-terpineol*

In a 500 cc. flask there were placed 50 g. of the vinyl ether of dihydro-α-terpineol and 300 cc. of pentane. After cooling the resultant solution to −120° C., 0.5 cc. of boron trifluoride etherate (the complex of boron trifluoride and ethyl ether) was added. The mixture was then stirred at −110° C. to −120° C. for 30 minutes. At this point another 0.5 cc. of the etherate was added with continued stirring for an additional 30 minutes. The mixture was then allowed to warm to −60° C. and was poured into 300 cc. of aqueous 5% sodium hydroxide. The organic layer was washed with a second portion of 300 cc. of aqueous 5% sodium hydroxide and then filtered. The polymer was precipitated from the organic solution by stirring into 5 volumes of ethyl alcohol. After filtration and drying, the polymer obtained corresponded to a yield of 80% based on the monomer. It had a specific viscosity of 0.483 (determined on the basis of a 1% solution of the polymer in benzene). It had a drop softening point (Hercules) greater than 250° C.

(b) *Preparation of ink*

A 50% solution of the above polymer in Magie 470 solvent was prepared. Magie 470 solvent is a petroleum hydrocarbon solvent which is more fully characterized hereinafter. Forty parts of this solution and 65 parts of chrome yellow were milled together on a 3-roll mill to provide an ink suitable for application on a typographic press. The ink was applied to paper (uncoated book stock) and the solvent was flashed off at 400° F. The resulting prints had a very high gloss and were outstanding from the standpoint of flexibility of the ink films. The hold-out and scuff-resistance of the ink were also very good.

EXAMPLE 2

(a) *Preparation of polymer of the vinyl ether of α-terpineol*

The polymerization in this case was carried out similarly to that described in Example 1 (a) hereof using the vinyl ether of α-terpineol in place of the vinyl ether of dihydro-α-terpineol. However, hexane was used as a solvent for the ether in the proportions of 3 parts of solvent per part of the ether and the polymerization was carried out at −75° C. with boron trifluoride as catalyst rather than the etherate thereof. The polymer was isolated from the polymerization mixture as in the case of Example 1 (a) to provide a resinous polymer having a specific viscosity of 0.060 (determined on a 1% solution of the polymer in benzene). The yield of the polymer was 42% based on the monomer.

(b) *Preparation of inks*

This polymer was converted to a heat-set ink using a similar formulation to that of Example 1 (b). This ink was applied to paper of the type used in Example 1 (b) and the resulting prints were found to have very high gloss, accompanied by excellent flexibility of the ink films. Again the hold-out and scuff-resistance were very good.

EXAMPLE 3

(a) *Preparation of polymer of the vinyl ether of pine oil*

The vinyl ether of a pine oil was polymerized in accordance with the method of Example 2 (a) hereof, using however, 5 parts of hexane to one part of the vinyl ether. The pine oil from which the ether was prepared was a cut obtained in the distillation of the oils extracted from pine wood by the various processes known to the art. This particular cut comprised the compounds distilling in the range of 195 to 210° C. at atmospheric pressure. It was predominantly fenchyl alcohol (about 50–70%). Other terpene alcohols present were borneol, α-terpineol, and β-terpineol. Among the nonalcoholic constituents present were terpinolene, fenchone, camphor, and estragole. The total of such nonalcoholic constituents was about 15%. The polymer obtained in this manner has a specific viscosity of 0.095 (determined on a 1% solution of the polymer in benzene) and a drop softening point (Hercules) of 220° C. and was obtained in an amount corresponding to a yield of 80% based on the monomer.

(b) *Preparation of ink*

An ink was prepared from this resin using the formulation of Example 1 (b). Upon application to paper it was found to provide prints of outstanding gloss. The ink films were also outstanding from the standpoint of their flexibility characteristics.

EXAMPLE 4

(a) *Preparation of polymer of the vinyl ether of fenchyl alcohol*

Into a 250 cc. 3-neck flask fitted with a thermometer, stirrer, and glass inlet tube, were placed 20 g. of the vinyl ether of fenchyl alcohol and 80 cc. of hexane. The flask was blown out with nitrogen, cooled to −77° C., and boron trifluoride diluted with nitrogen (about 1 part by volume of boron trifluoride to 1 part of nitrogen) was fed in. When the polymerization reaction started, the temperature rose and reached a maximum 11° C. above the original temperature. The resulting product (a yellow solution) was washed 3 times with 100 cc. portions of aqueous 10% NaOH. The polymer was recovered from the resulting solution by precipitation from 800 cc. of ethyl alcohol. The polymer so obtained was dried in a vacuum for 17 hours at 80° C. It was obtained in the amount of 13.22 g. which corresponds with a yield of 66%. It had a specific viscosity of 0.066 (determined on a 1% solution of the polymer in benzene).

(b) *Preparation of ink*

A heat-set ink was prepared from this polymer using the formulation and procedure of Example 1 (b). The ink was applied to paper as in Example 1 (b) and the resulting prints were found to have a very high gloss. The ink films were also very flexible. The ink itself was found to have very fast solvent release and heat-setting properties.

The preparation of vinyl ethers of terpene alcohols is known to the art and is not part of this invention. Reference is made to French patent of addition 46,453 (main Patent 724,955). As there indicated, mono- or polycyclic terpene alcohols may be employed. The terpene alcohols may be secondary or tertiary. In addition to the specific terpene alcohols there mentioned as useful, there may be employed fenchyl alcohol, isofenchyl alcohol, α-terpineol, β-terpineol, gamma-terpineol, dihydro-α-terpineol, dihydro-β-terpineol, verbanol, etc. Mixtures of terpene alcohols such as the pine oil used in Example 3, etc. may be employed and their use is particularly significant from a commercial standpoint due to the fact that they are less expensive than the comparatively pure compounds.

Neither is the preparation of polymers of vinyl ethers of terpene alcohols a part of this invention since procedures therefor are known to the art. Reference is made to French patent 734,129 in this connection. Furthermore, specific procedures for the preparation of these polymers are described in the examples hereof. Any of the methods of polymer preparation described herein or in the above-mentioned French patent are suitable for making the polymers used in accordance with this invention.

While as previously indicated, polymers of vinyl ethers of terpene alcohols are generally useful in the preparation of heat-set inks, the experiments carried out in connection with this invention have indicated that with respect to the broad class of polymers here involved the drop softening point of the polymer is a critical factor with respect to obtaining inks with the improved properties which this invention allows. It has been found that resinous polymers of vinyl ethers of terpene alcohols having a drop softening point of at least 130° C. are operable in this invention as producing inks with the above-named improved properties and that polymers having drop softening points of at least 170° C. must be employed to obtain prints having a noticeable improvement in gloss as compared with prints based on prior art resins. For this reason, polymers having drop softening points of at least 170° C. are preferred in this invention as producing glossy prints while retaining the other properties which have been found to be characteristic of the inks produced in accordance with this invention, namely, good flexibility, good scuff resistance and improved hold-out of the ink on the paper. Generally speaking, the greater the increase in drop softening point over the 170° C. range the higher the gloss. There are, of course, practical considerations such as solubility, etc. which place a maximum limitation on the drop softening point of the polymer.

The volatile solvent used in preparing the subject heat-set inks may be any of those used in the art in making this type of ink. They may be broadly defined as an organic solvent which is substantially nonvolatile at 70° F. but which has a comparatively high vapor pressure at temperatures of the order of 200–240° F. The solvents usually employed are those having a narrow boiling range. The solvents are generally special petroleum hydrocarbon fractions having boiling ranges lying between 400° and 550° F. These must, of course, be good solvents for the resin or resins employed and should be free from "heavy ends" and objectionable odors. An example of such a petroleum hydrocarbon fraction is the Magie 470 solvent employed in the examples hereof. The physical characteristics of this and other representative petroleum hydrocarbon heat-set ink solvents are given below.

|  | Magie 470 | Magie 535 | Solvent A |
|---|---|---|---|
| Aniline Point °C | 80.2 | 78.4 | 81–82 |
| Kauri Butanol Value | 22.2 | 21.8 | 21.9 |
| Specific Gravity 15.6°/15.6° | 0.8052 | 0.8479 | 0.8366 |
| Refractive Index at 20° C | 1.4473 | 1.4705 | 1.4652 |
| Distillation Range: |  |  |  |
| 1st Drop | 242 | 291 | 243 |
| 5% | 249 | 297 | 292 |
| 95% | 265 | 318 | 314 |
| Dry Flask | 271 | 323 | 320 |

Oxygenated solvents such as the monobutyl ether of diethylene glycol may also be used.

As has been previously stated, the major part of the resinous binder component of the vehicle must be a resinous polymer of a vinyl ether of a terpene alcohol. Preferably, the resinous polymer will constitute at least 80% of the resinous binder component. Due to the inherent flexibility of ink films prepared from these polymers, it is not necessary to resort to the use of softeners or plasticizers as part of the resinous binder component for the purpose of flexibilizing the films. Hence, it is quite practical as is illustrated by the examples to formulate inks on the basis that the resinous binder component is 100% a polymer of a vinyl ether of a terpene alcohol. For one or another reason, however, modifiers may be added to provide some particular effect. Thus, there may be added minor proportions of any of the aforementioned prior art resins. Similiarly, there may be added minor proportions of compatible thermoplastic film-forming agents. Occasionally, softeners or plasticizers such as dibutyl phthalate, drying oils, etc. although not necessary for normal operations, may be added in minor proportions to provide some special effect.

The resinous binder content of the vehicle of the subject printing inks may be varied in accordance with the knowledge of the art. In general, the resinous binder component will amount to from about 25% to about 75% by weight of the vehicle. However, the invention is not limited to such compositions in any way.

The novel printing inks described herein can be used not only in the printing of paper but they may also be adapted for use in printing many other surfaces, such as metal foils, textiles, regenerated cellulose sheets (cellophane), etc.

This application is a continuation-in-part of application Serial No. 133,010, filed December 14, 1949, now abandoned.

What we claim and desire to protect by Letters Patent is:

1. A heat-set printing ink containing coloring matter dispersed in a vehicle comprising a resinous binder component in solution in a solvent therefor which is substantially nonvolatile at 70° F. but which has a comparatively high vapor pressure at temperatures of the order of 200–240° F., the major part of said resinous binder component being a resinous polymer of a vinyl ether of a terpene alcohol, the resinous polymer having a drop softening point of at least 130° C.

2. A heat-set printing ink containing coloring matter dispersed in a vehicle comprising a resinous binder component in solution in a solvent therefor which is substantially nonvolatile at 70° F. but which has a comparatively high vapor pressure at temperatures of the order of 200-240° F., the major part of said resinous binder component being a resinous polymer of a vinyl ether of a terpene alcohol, the resinous polymer having a drop softening point of at least 170° C.

3. The composition of claim 1 in which the solvent is a petroleum hydrocarbon solvent.

4. The composition of claim 1 in which the terpene alcohol is a secondary terpene alcohol.

5. The composition of claim 1 in which the terpene alcohol is a tertiary terpene alcohol.

6. The composition of claim 1 in which the terpene alcohol is fenchyl alcohol.

7. The composition of claim 1 in which the terpene alcohol is dihydro-α-terpineol.

8. The composition of claim 1 in which the terpene alcohol is α-terpineol.

WALTER S. ROPP.

REFERENCES CITED

The following references are of record in the file of this patent:

UNITED STATES PATENTS

| Number | Name | Date |
|---|---|---|
| 2,108,994 | Reppe | Feb. 22, 1938 |

OTHER REFERENCES

"Progress In Manufacture and Use of Vinyl Ethers," article by Reppe published by Office of Technical Services, Dept. of Commerce, Washington, D. C., received in Patent Office Library Jan. 13, 1948.